(12) United States Patent
Hoehne et al.

(10) Patent No.: US 7,581,698 B2
(45) Date of Patent: Sep. 1, 2009

(54) METHOD AND APPARATUS FOR TEMPERING GASEOUS AND/OR LIQUID MEDIA IN TRANSPORTATION VEHICLES, PARTICULARLY IN AIRCRAFT

(75) Inventors: Merle Hoehne, Hamburg (DE);
Joachim Hoehne, Hamburg (DE);
Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 721 days.

(21) Appl. No.: 11/115,074

(22) Filed: Apr. 25, 2005

(65) Prior Publication Data

US 2005/0253019 A1 Nov. 17, 2005

Related U.S. Application Data

(60) Provisional application No. 60/600,061, filed on Aug. 9, 2004.

(30) Foreign Application Priority Data

Apr. 23, 2004 (DE) ........................ 10 2004 019 790

(51) Int. Cl.
*F28D 15/00* (2006.01)
*B64D 11/00* (2006.01)
(52) U.S. Cl. ............................... 244/118.5; 165/104.12
(58) Field of Classification Search ............. 244/118.5, 244/171.8, 117 A; 165/104.12; 62/4; 126/204, 126/263.01, 263.02
See application file for complete search history.

(56) References Cited

U.S. PATENT DOCUMENTS 2,669,101 A * 2/1954 Shields ............................. 62/5
3,009,327 A * 11/1961 Weil ................................. 62/4
3,015,461 A * 1/1962 Fineblum ................. 244/117 A
3,075,361 A * 1/1963 Lindberg, Jr. ..................... 62/4
3,231,336 A * 1/1966 Lindberg, Jr. ............... 422/109
3,929,305 A * 12/1975 Sabol ..................... 244/117 A (Continued)

FOREIGN PATENT DOCUMENTS

EP 1 543 753 6/2005

(Continued)

OTHER PUBLICATIONS

"Boeing Backs Start-Up's Project: In-Flight Shower: Ultimate Perk?" Buerkle, T., International Herald Tribune, Jul. 31, 2000 Available at http://www.iht.com/articles/2000/07/31/ttshower.2.t.php.*

*Primary Examiner*—Michael R Mansen
*Assistant Examiner*—Joseph W Sanderson
(74) *Attorney, Agent, or Firm*—W. F. Fasse; W. G. Fasse (57) ABSTRACT

A transportation vehicle includes a fluid tempering arrangement to supply a gaseous and/or liquid, heated and/or cooled, fluid such as water. At least one thermochemical reservoir is in heat exchange relation with a conduit system, having at least one valve and a controller that controls the transfer of heat between the fluid and the thermochemical reservoir to adjust the temperature of the fluid provided to an outlet. Preferably two interconnected thermochemical reservoirs respectively contain hydride-forming metals having different hydrogen sorption-desorption temperatures. By sorption and desorption of hydrogen in the two reservoirs, heat energy produced electrically during low electrical demand can be chemically stored and later released for heating the fluid during high electrical demand.

30 Claims, 2 Drawing Sheets

U.S. PATENT DOCUMENTS

| | | | | |
|---|---|---|---|---|
| 4,051,888 | A | * | 10/1977 | Yamada et al. ......... 165/104.12 |
| 4,161,211 | A | | 7/1979 | Duffy et al. |
| 4,178,987 | A | * | 12/1979 | Bowman et al. ....... 165/104.12 |
| 4,214,699 | A | * | 7/1980 | Buchner et al. ......... 237/12.3 C |
| 4,589,479 | A | * | 5/1986 | Gamo et al. ........... 165/104.12 |
| 4,603,732 | A | * | 8/1986 | Niggemann .................. 165/41 |
| 4,623,018 | A | * | 11/1986 | Takeshita et al. ....... 165/104.12 |
| 4,736,596 | A | * | 4/1988 | Iguchi et al. ................ 62/238.7 |
| 5,085,271 | A | * | 2/1992 | Yanadori et al. ........ 165/104.12 |
| 5,117,901 | A | * | 6/1992 | Cullimore .................... 165/86 |
| 5,323,843 | A | | 6/1994 | Olzewski et al. |
| 5,351,747 | A | * | 10/1994 | Koeppl ........................ 165/41 |
| 5,469,913 | A | * | 11/1995 | Gamou et al. .......... 165/104.12 |
| 5,518,069 | A | * | 5/1996 | Maier-Laxhuber et al. ........ 165/104.12 |
| 5,526,648 | A | * | 6/1996 | Wertenbach et al. .......... 62/101 |
| 5,687,932 | A | * | 11/1997 | Gomes .................... 244/171.8 |
| 5,746,064 | A | * | 5/1998 | Tsenter ....................... 62/480 |
| 5,768,906 | A | * | 6/1998 | Tsenter ....................... 62/480 |
| 6,425,440 | B1 | * | 7/2002 | Tsenter et al. ......... 165/104.12 |
| 6,560,971 | B2 | * | 5/2003 | Takao et al. .................. 62/54.1 |
| 6,626,231 | B2 | * | 9/2003 | Cluzet et al. ................... 165/41 |
| 6,698,389 | B2 | * | 3/2004 | Andrews et al. ......... 123/41.31 |
| 6,918,430 | B2 | * | 7/2005 | Myasnikov et al. .... 165/104.12 |
| 2002/0112848 | A1 | * | 8/2002 | Tsenter et al. ......... 165/104.12 |
| 2003/0042361 | A1 | * | 3/2003 | Simadiris et al. ......... 244/118.5 |
| 2005/0158041 | A1 | | 7/2005 | Hoehne et al. |

FOREIGN PATENT DOCUMENTS

| | | | |
|---|---|---|---|
| JP | 61193914 A | * | 8/1986 |
| JP | 62169997 A | * | 7/1987 |
| WO | WO00/79201 | | 12/2000 |

* cited by examiner

FIG. 1

FIG. 2

METHOD AND APPARATUS FOR TEMPERING GASEOUS AND/OR LIQUID MEDIA IN TRANSPORTATION VEHICLES, PARTICULARLY IN AIRCRAFT

CROSS-REFERENCE TO RELATED APPLICATION

This U.S. Non-Provisional Application claims the benefit under 35 U.S.C. § 119(e) of U.S. Provisional Application 60/600,061, filed on Aug. 9, 2004, the entire disclosure of which is incorporated herein by reference.

PRIORITY CLAIM

This application is based on and claims the priority under 35 U.S.C. § 119 of German Patent Application 10 2004 019 790.3, filed on Apr. 23, 2004, the entire disclosure of which is incorporated herein by reference.

FIELD OF THE INVENTION

The invention relates to a method and an apparatus for tempering, i.e. heating and/or cooling, gaseous and/or liquid fluids in transportation vehicles, particularly in aircraft.

BACKGROUND INFORMATION

In transportation vehicles, especially on board of air vehicles such as aircraft or airplanes for example, apparatuses for the warming or heating of media, i.e. gaseous and/or liquid fluids, particularly water and/or air for example, are being increasingly employed for various different applications or uses. Moreover, apparatuses for the cooling of fluids are also being used. Such apparatuses, which are often electrically operated, can for example be boilers, through-flow heaters, chillers, cooling devices, etc., in which water, for example, is tempered. The warmed or heated water or the produced steam can then be used, for example in on-board galleys for the preparation of hot beverages, meals and/or for cleaning or rinsing purposes. In sanitary areas, the warm or hot water can be used, for example, for water tap or faucet locations, bidets, bathtubs, showers, or the like. Cooled air or cooled water can be used, among other things, for the air conditioning of the cabin space within the vehicle.

The operation of these conventionally known electrical devices for the heating or cooling of larger water quantities is generally associated with a high demand of electrical energy. This pertains especially when sufficient warm or hot water is to be provided for showering or bathing. Rapid temperature changes in response to user requirements still further increase the energy demand necessary for the tempering of the fluid.

This leads to very high load peaks in the electrical on-board power supply of the transportation vehicle, e.g. an aircraft, especially in the time periods in which a high demand for warm and hot water exists, for example at the meal times or in the early morning after the sleeping phase of a flight. In order to be able to also cover the highest possible theoretically conceivable load peak in the electrical on-board power supply, it must be dimensioned correspondingly large. As a result, the electrical on-board power supply, including the conductor lines, the electrical generators, or the other current sources, must be laid-out or designed with a higher power capacity than would actually be necessitated by the average energy demand on board the transportation vehicle over the course of the entire day. The higher power capacity design of the electrical on-board power supply generally also necessitates a significant increase of the weight, which is disadvantageous especially in aircraft, because thereby the operating range is reduced, for example.

Thus, the conventionally known apparatuses that are exclusively electrically powered for the rapid tempering, that is to say for the warming, heating or cooling of larger volume flows of water and/or other fluids, are suitable only conditionally or with limitations, especially for air vehicles.

SUMMARY OF THE INVENTION

In view of the above, it is an object of the invention to achieve a rapid tempering of gaseous and/or liquid media (i.e. fluids) in a transportation vehicle, while preferably simultaneously evening-out or smoothing the electrical load curve of the electrical on-board power supply of the transportation vehicle. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an improvement in a transportation vehicle including a fluid supply system adapted to supply a gaseous and/or liquid fluid. The fluid supply system includes a fluid outlet, a fluid inlet arrangement having at least one of a fluid inlet and a fluid reservoir, a fluid conduit system connecting the fluid inlet arrangement to the fluid outlet so as to provide the fluid from the fluid inlet arrangement to the fluid outlet, and a fluid tempering arrangement that is interposed in the fluid conduit system and adapted to heat and/or cool the fluid passing therethrough. According to the inventive improvement, the fluid tempering arrangement comprises: a first thermochemical reservoir that is adapted to store energy therein and that is arranged in heat exchange relation with the conduit system; at least one valve interposed in the conduit system and/or connected to the first thermochemical reservoir; and a controller connected for control signal transmission to the at least one valve and adapted to variably control a transfer of heat between the fluid and the first thermochemical reservoir so as to adjustingly set a temperature of the fluid provided to the fluid outlet.

More preferably, the inventive improvement is provided in an aircraft including a water supply system having a water outlet, a water inlet arrangement, a water conduit system connecting the water inlet arrangement to the water outlet so as to provide water from the water inlet arrangement to the water outlet, and a water tempering arrangement that is interposed in the water conduit system and adapted to heat and/or cool the water passing therethrough. According to this preferred embodiment of the inventive improvement, the water tempering arrangement comprises: a first thermochemical reservoir comprising a first hydride-forming metal arranged in heat exchange relation with the conduit system; a second thermochemical reservoir comprising a second hydride-forming metal arranged in heat exchange relation with the conduit system; a hydrogen transfer conduit interconnecting the first and second thermochemical reservoirs; hydrogen provided in at least one of the thermochemical reservoirs and adapted to be transferred between the thermochemical reservoirs through the hydrogen transfer conduit; at least one valve interposed in the water conduit system and/or in the hydrogen transfer conduit; and a controller connected for control signal transmission to the at least one valve and adapted to variably control a transfer of heat between the water and at least one of the thermochemical reservoirs so as to adjustingly set a temperature of the water provided to the water outlet.

Moreover, the above objects have also been achieved according to the invention in a method of tempering a gaseous and/or liquid fluid in a fluid supply system in a transportation vehicle, comprising the steps:

a) supplying the fluid via a fluid supply arrangement of the fluid supply system;
b) bringing the fluid into heat exchange relation with a first thermochemical reservoir of the fluid supply system adapted to thermochemically store and/or release heat energy;
c) transferring heat from the first thermochemical reservoir to the fluid or from the fluid to the first thermochemical reservoir, so as to temper the fluid and produce therefrom a tempered fluid;
d) flowing the tempered fluid to a fluid outlet of the fluid supply system; and
e) controlling the transferring of the heat in the step c) with a controller so as to adjustingly set a temperature of the tempered fluid provided at the fluid outlet.

More preferably the above objects have been achieved according to the invention in a method of tempering water in an aircraft water supply system including a first thermochemical reservoir containing a first hydride-forming metal and a second thermochemical reservoir containing a second hydride-forming metal. This preferred embodiment of the inventive method comprises the steps:

a) supplying heat energy to the second thermochemical reservoir and thereby desorbing and liberating hydrogen from the second hydride-forming metal;
b) transferring the hydrogen from the second thermochemical reservoir to the first thermochemical reservoir;
c) sorbing the hydrogen in and/or on the first hydride-forming metal and thereby forming a hydride and releasing heat;
d) transferring the heat from the first thermochemical reservoir to the water to produce heated water; and
e) flowing the heated water to a water outlet.

A defined and substantially low-delay tempering even of larger volume flows of the fluid in the area of a fluid outlet is achievable without excessive loading of the electrical on-board power supply of the transportation vehicle because, according to the inventive method and/or using the inventive apparatus, thermal energy is stored in at least one thermochemical reservoir (e.g. during periods of low electrical demand), and then (e.g. during a period of high electrical demand) the thermal energy from the thermochemical reservoir or reservoirs is supplied to or withdrawn from a gaseous and/or liquid fluid supplied via the fluid reservoir and/or the feed inlet, whereby the supply or the withdrawal of the thermal energy is varied by means of the control and regulating arrangement for the adjusted setting of a temperature of the fluid provided at the fluid outlet.

The method according to the invention as well as the apparatus according to the invention are used in an advantageous manner for the tempering of gas and/or liquid fluids to be supplied to a fluid outlet.

Thus, for example, water withdrawn from a water reservoir or a water supply or feed line can be quickly warmed in a first thermochemical reservoir, whereby the water is either delivered directly to a fluid outlet and/or is first mixed with the water in the water reservoir before being delivered away to the fluid outlet. In this regard, the warming in the first thermochemical reservoir is achieved through the introduction of hydrogen into this reservoir, which is given off from a second thermochemical reservoir, to which heat had been supplied preferably at a lower temperature level over a longer time duration.

If, in a contrary fashion, the water is now to be cooled, for example, then the water is directed through the second thermochemical reservoir, cooled therein, and thereafter directed to the fluid outlet.

Through a simple and rapidly possible switching-over, for example by means of known electrically operable valves, the through-flow of the water can be switched between the first and the second thermochemical reservoir, so that nearly delay-free temperature changes of the water in the area of the fluid outlet are realizable. An additional advantage of the apparatus is that these temperature changes in the course of the tempering are possible without an excessive supply of electrical energy.

Thus, the method according to the invention as well as the apparatus are predestined for the rapid tempering of liquid and/or gaseous fluids in the area of the fluid outlet, especially for the tempering of water in sanitary areas, kitchens or galleys, or lounges.

Simultaneously, through the desorption of hydrogen in a second thermochemical reservoir, heat energy can be (chemically) accumulated at a low temperature level over a longer time in a second thermochemical reservoir, and can again be given off at a high temperature level for a shorter time in a first thermochemical reservoir, e.g. during peak load times of the electrical on-board power supply, and can, for example, be used for the warming of water. Parallel to this, a cooling of the water in the second thermochemical reservoir is also possible if necessary. Simultaneously, through the operation of the apparatus according to the invention, an evening-out or smoothing of the electrical load curve of the electrical on-board power supply is also achieved.

Further details and advantages arise from the following description of an example embodiment of the apparatus according to the invention.

BRIEF DESCRIPTION OF THE DRAWINGS

In order that the invention may be clearly understood, it will now be described in connection with an example embodiment thereof, with reference to the accompanying drawings, of which the FIG. 1 is a schematic diagram of the principle components of an apparatus for tempering water according to the invention, which is shown schematically as a liquid and gaseous water tempering system on board an aircraft in FIG. 2.

DETAILED DESCRIPTION OF A PREFERRED EXAMPLE EMBODIMENT AND OF THE

BEST MODE OF THE INVENTION

Figure 1:
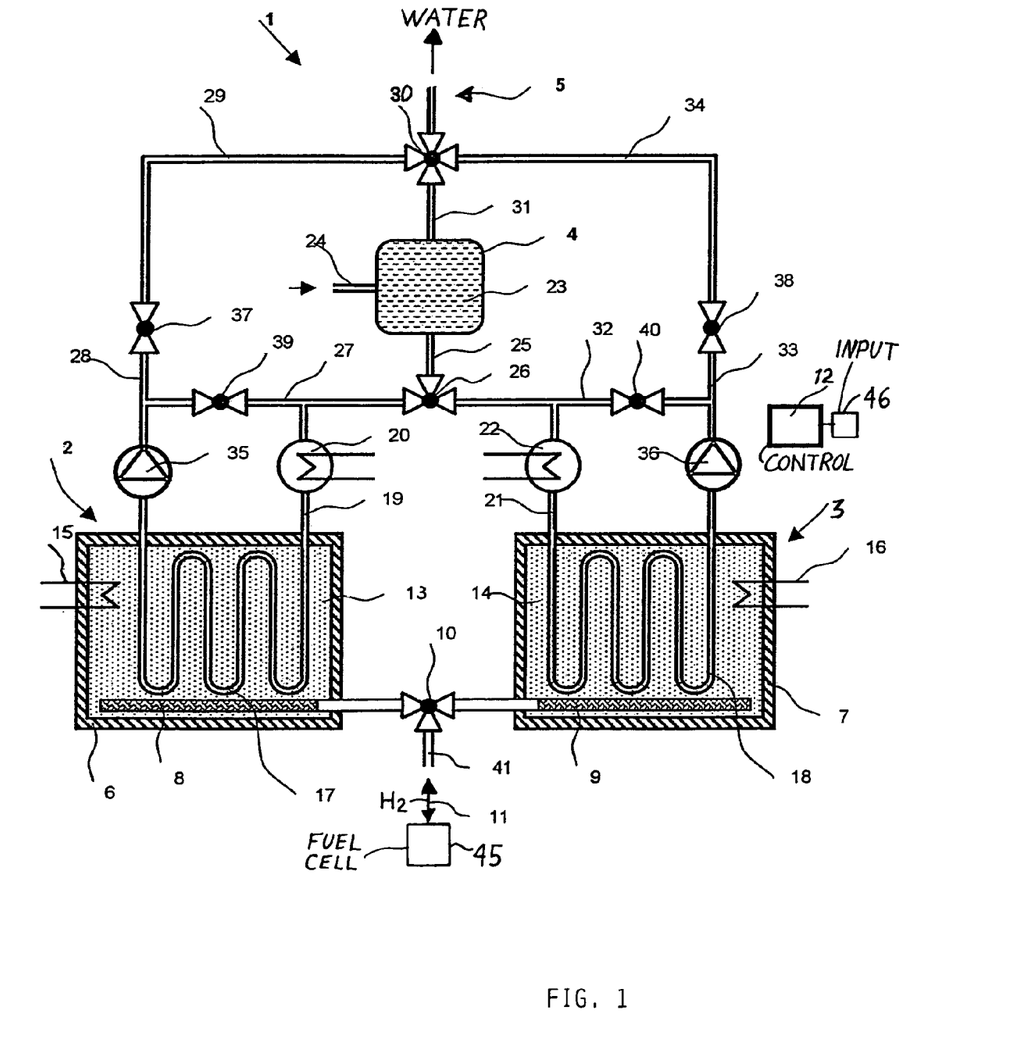
Figure 2:
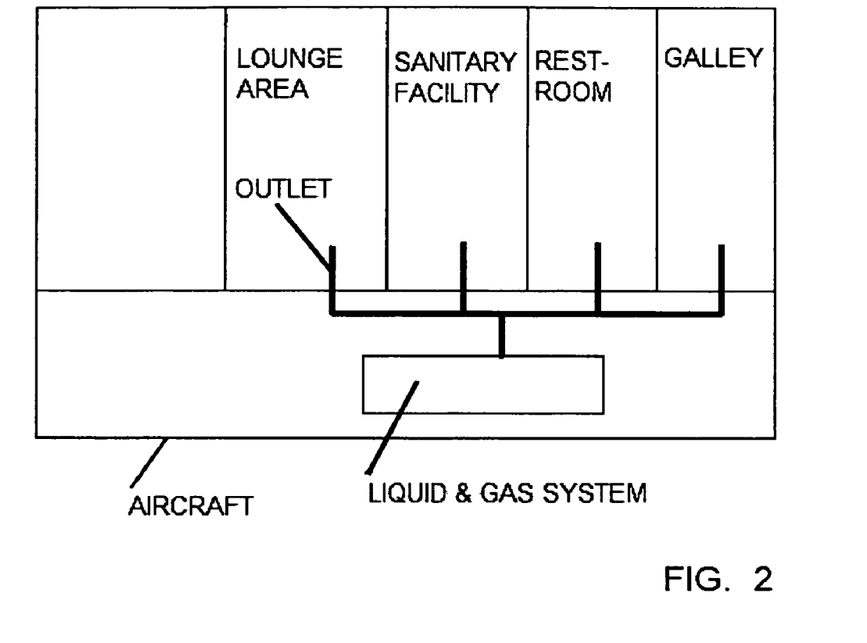

FIG. 1 shows an example embodiment of an apparatus 1 according to the invention for the tempering of gaseous and/or liquid fluids in transportation vehicles, especially in aircraft for example as schematically shown in FIG. 2.

The apparatus 1 consists, among other things, of a first thermochemical reservoir 2, a second thermochemical reservoir 3, a fluid reservoir 4, as well as a fluid outlet 5.

The first thermochemical reservoir 2 comprises, among other things, a first container 6, and the second thermochemical reservoir 3 includes a second container 7. The first and the second containers 6, 7 can be provided with an additional thermal insulation, in order to minimize heat losses. Furthermore the containers 6, 7 are embodied to be pressure-resistant and gas-tight.

A first hydrogen distributor 8 is arranged within the first container 6, and correspondingly a second hydrogen distributor 9 is arranged in the second container 7. The hydrogen distributors may comprise perforated or porous pipes, or any conventionally known device for distributing a gas. The first and second hydrogen distributors 8, 9 are connected with one another via a hydrogen regulating valve 10 interposed in a hydrogen transfer conduit running between the two thermochemical reservoirs. The hydrogen regulating valve 10 is additionally connected with a hydrogen source or sink that is merely indicated by an arrow 11 in the illustration of FIG. 1. In this regard the source or sink may involve, for example, a hydrogen storage reservoir or a fuel cell for the production of electrical energy. An example of a hydrogen sink is shown schematically as a fuel cell 45. Furthermore, the hydrogen regulating valve 10 is connected with a control and regulating arrangement 12.

By means of the control and regulating arrangement 12, among other things, the hydrogen regulating valve 10 may be preferably electrically operated, so that hydrogen can flow from the second thermochemical reservoir 3 into the first thermochemical reservoir 2 and vice versa via the hydrogen transfer conduit, if the hydrogen regulating valve 10 is at least partially opened by the control and regulating arrangement 12 and a pressure difference prevails between the thermochemical reservoirs 2, 3. Furthermore, if necessary, hydrogen can also be supplied to the thermochemical reservoirs 2, 3 from the external hydrogen source by means of the hydrogen regulating valve 10, for replenishing possible losses, or can be discharged via the valve 10 to the fuel cell 45 or any other hydrogen sink.

The first container 6 is at least partially filled with a first metal and/or a first metal alloy 13 for the formation of a corresponding metal hydride and/or a metal alloy hydride through the incorporation of hydrogen through sorption, i.e. absorption or adsorption. Corresponding to this, the second container 7 is filled with a second metal and/or a second metal alloy 14 for the formation of corresponding metal hydrides or metal alloy hydrides through the sorption incorporation of hydrogen.

In the illustrated embodiment variant of the apparatus 1, the first metal and/or the first metal alloy 13 comprises a higher hydrogen desorption temperature at a pressure of 1 bar in comparison to the second metal and/or the second metal alloy 14. In an especially preferred embodiment variant, the first metal and/or the first metal alloy 13 forms a high temperature metal hydride through the sorption introduction or incorporation of hydrogen, and the second metal and or the second metal alloy 14 forms a low temperature metal hydride through the sorption introduction or incorporation of hydrogen. In the illustrated example embodiment, the metals and/or metal alloys 13, 14 are present as a loose fill with a certain granule size. Hydride-forming metals and/or metal alloys suitable for this purpose have previously been fully described in the state of the art.

In a ready or standby phase of the apparatus 1, nearly the entire working or releasable hydrogen of the system (for example more than 75%, or more than 85%, or even more than 90%) is located within the second thermochemical reservoir 3. The thermal energy that is supplied preferably at a low temperature level to the second thermochemical reservoir 3 is thus present almost completely in chemically bonded form as a hydride. That is to say that nearly the entire supplied thermal energy is durably stored in the second thermochemical reservoir 3 in chemical form through hydride formation in the area of the second metal and/or the second metal alloy 14.

A thermal insulation of the containers 6, 7 can thus reduce possible heat losses only at those times in which the first and/or the second thermochemical reservoir 2, 3 takes-up or gives-off thermal energy.

Furthermore, first and second reservoir tempering arrangements 15, 16 are arranged in the first and second thermochemical reservoirs 2, 3. The first and second reservoir tempering arrangements 15, 16 are positioned in the area of the first metal and/or of the first metal alloy 13 as well as in the area of the second metal and/or of the second metal alloy 14.

The reservoir tempering arrangements 15, 16 can both supply thermal energy to, as well as remove thermal energy from, the thermochemical reservoirs 2, 3, that is to say can act in a heating or cooling manner. The reservoir tempering arrangements 15, 16 can be embodied as electrical heating and/or cooling elements, for example as Peltier elements or the like, or as simple resistive heating elements.

Furthermore, a first heat exchanger 17 as well as a second heat exchanger 18 are arranged within the first and the second containers 6, 7 respectively. In the illustrated example embodiment, the heat exchangers 17, 18 are embodied as serpentine pipes, which are positioned in the area of the first metal and/or the first metal alloy 13 or respectively in the area of the second metal and/or the second metal alloy 14. Depending on the nature or characteristics of the metals and/or of the metal alloys 13, 14, other construction forms can be selected for the embodiment of the heat exchangers 17, 18.

A first supply or feed line tempering arrangement 20 is located in the area of a first supply or feed line 19 to the first thermochemical reservoir 2. Corresponding hereto, a second feed line tempering arrangement 22 is arranged in the area of a second feed line 21 to the second thermochemical reservoir 3. The first and second feed line tempering arrangements 20, 22 can be embodied as electrical heating and/or cooling elements, for example as Peltier elements or the like, or as simple resistive heating elements. The reservoir tempering arrangements 15, 16 as well as the feed line tempering arrangements 20, 22 can, however, also be embodied as heat exchangers, for example, in order to be able to supply or remove thermal energy (e.g. waste heat or excess heat) from external thermal processes.

Any desired or arbitrary gaseous and/or liquid fluid, for example water, air, water vapor or steam, or other technical gases can be stored in the fluid reservoir 4. The further description of the present embodiment will be based on an example in which the fluid 23 is water.

The fluid outlet 5 may involve any desired or arbitrary water withdrawing location, fixture or device, for example a water tap or faucet in a lounge area, a galley, or a restroom or sanitary facility, a water mixing battery, a shower, a bathtub inlet or fill tap, or the like, in a transportation vehicle such as an aircraft schematically shown in FIG. 2. Furthermore, the fluid outlet 5 can also be any desired or arbitrary kitchen appliance, for example a coffee or espresso machine, as well as a water bath for meal or food heating, or the like.

The fluid outlet 5 may involve any desired or arbitrary water withdrawing location, fixture or device, for example a water tap or faucet, a water mixing battery, a shower, a bathtub inlet or fill tap, or the like. Furthermore, the fluid outlet 5 can also be any desired or arbitrary kitchen appliance, for example a coffee or espresso machine, as well as a water bath for meal or food heating, or the like.

Beginning from the regulating valve 26, the water can alternatively be supplied via a line 32 of the second feed line 21 and therewith to the second heat exchanger 18. From the second heat exchanger 18, the water proceeds via a second return line 33 as well as the further line 34 to the fluid outlet regulating valve 30, and from there either again back into the fluid reservoir 4 or directly to the fluid outlet 5.

A first pump 35 and a second pump 36 are respectively arranged in the first and second return lines 28, 33. The pumps 35, 36 are preferably electrically driven and controllable by means of the control and regulating arrangement 12, so that especially a continuous or step-less through-flow quantity regulation dependent on the delivered or output quantity of the tempered water in the area of the fluid outlet 5 is possible.

A valve 37 is arranged between the lines 28, 29. The valve 38 is located in the area of the lines 33, 34. Furthermore, the valves 39 and 40 are arranged in the area of the lines 27, 32. The valves 37, 38, 39, 40 preferably similarly involve valves that are electrically operable by the control and regulating arrangement 12, and that may alternatively also be only partially opened or closed by the control and regulating arrangement 12, for example for achieving a through-flow quantity regulation. The same is true for the hydrogen regulating valve 10, the regulating valve 26 as well as the fluid outlet regulating valve 30.

As already described above, in a ready or standby phase of the apparatus 1, nearly the entire hydrogen is located in the area of the second thermochemical reservoir 3. If now, for example, water is to be warmed and delivered from the fluid outlet 5 in a utilization or use phase for showering, bathing or for use in an on-board galley in air vehicles etc., for example as shown in FIG. 2, then first the hydrogen regulating valve 10 is at least partially opened by the control and regulating arrangement 12. Thereupon the hydrogen flows from the second thermochemical reservoir 3 into the first thermochemical reservoir 2 due to the prevailing pressure drop. If applicable, the desorption or the driving-out or expelling of the hydrogen out of the second thermochemical reservoir 3 must be supported, assisted or maintained through an additional direct heating with the second reservoir tempering arrangement 16. Alternatively, the same assisting or maintaining effect is achievable if the water is indirectly warmed by means of the second feed line tempering arrangement 22 in the area of the second thermochemical reservoir 3.

The hydrogen desorbed in the area of the second thermochemical reservoir 3 is absorbed by the first metal and/or the first metal alloy 13 within the first thermochemical reservoir 2. The heat being released at a high temperature level within the first metal and/or the first metal alloy 13 in the hydride formation warms or heats the water located in the first heat exchanger 17. Then, the warmed water proceeds via the first return line 28 and the line 29 connected therewith, to the fluid outlet regulating valve 30, from where the water is directed either directly to the fluid outlet 5 or initially again back into the fluid reservoir 4. In this state of the apparatus, the valves 39, 40 are preferably completely closed, so that the water necessarily flows through the heat exchangers 17, 18.

If now, for example, the temperature of the water in the area of the fluid outlet regulating valve 30 or the fluid outlet 5 is again to be reduced, then the control and regulating arrangement 12 first closes the hydrogen regulating valve 10 at least partially. Thereby the release of thermal energy in the first metal and/or the first metal alloy 13 is immediately reduced, so that the water in the area of the first heat exchanger 17 cools down. In order to further accelerate and/or assist the cooling process, it is possible to additionally allow the still-warm water to flow through the second heat exchanger 18 through a corresponding control of the regulating valve 26, the fluid outlet regulating valve 30 as well as the valves 37, 38, 39, 40 by means of the control and regulating arrangement 12. Due to the desorption of hydrogen still persisting in the area of the second thermochemical reservoir 3, thermal energy for maintaining the desorption process is still needed in this area, which thermal energy is again withdrawn or extracted from the water delivered via the second feed line 21, so that an additional cooling of the water in the area of the second heat exchanger 18 takes effect.

In order to still further accelerate the cooling of the water, it is further possible to open (bypass) the valve 39, so that the water essentially is no longer directed through the first heat exchanger 17 at all, and as a result of that no more thermal energy is transferred to the water from the first thermochemical reservoir 2.

In order that the control and regulating arrangement 12 can control the hydrogen regulating valve 10, the regulating valve 26, the fluid outlet regulating valve 30, the pumps 35, 36, the reservoir tempering arrangements 15, 16, the feed line tempering arrangements 20, 22 as well as the simple valves 37, 38, 39, 40, for adjustedly setting a certain defined temperature of the water in the area of the fluid outlet 5, additional temperature, through-flow quantity and/or pressure sensors, which are not shown in the drawing, are arranged at suitable areas of the conduit system. Furthermore, the control and regulating arrangement 12 is provided with an input, via which a user can regulate the temperature and/or the through-flow quantity of the water or a different fluid 23 in the area of the fluid outlet 5 in a substantially delay-free manner by means of a temperature selection input device 46. For this purpose, the control and regulating arrangement 12, for example may comprise a computer processor unit with corresponding control and regulating modules and/or running suitable control software, and/or may comprise a hard-wired control logic circuit, a thermostat arrangement, or any known device for regulating a temperature based on a selected input temperature.

Furthermore, the control lines for the connection of the control and regulating arrangement 12 with the hydrogen regulating valve 10, the regulating valve 26, the fluid outlet regulating valve 30, the pumps 35, 36, the reservoir tempering arrangements 15, 16, the feed line tempering arrangements 20, 22, as well as the further valves 37, 38, 39, 40 are not shown in the illustration of FIG. 1, due to the necessary illustrative overview and clarity. In this regard, the control lines are adapted to transmit control and regulating signals from and to the control and regulating arrangement 12 in an electrical, optical, pneumatic or hydraulic manner. Generally, the controller 12 is connected for control signal transmission to each of the valves, pumps, etc., which means that control signals can be transmitted in any known manner, and which may involve a physical connection via a wire, a fiber optic cable or the like, or may involve a non-physical link such as a radio link, and infrared link, or the like.

Another valve that is controllable by the control and regulating arrangement 12 and that is not shown in the illustration of FIG. 1 can further be provided in the area of the feed inlet 24.

By means of the apparatus 1 according to the invention, it is possible to vary the temperature of the water in the area of the fluid outlet 5 very rapidly and in a wide temperature interval or range, solely by a corresponding operation of the valves 10, 26, 30, the tempering arrangements 15, 16, 20, 22, as well as the pumps 35, 36 by means of the control and regulating arrangement 12, according to corresponding temperature and/or quantity instructions of a user to set the temperature and/or quantity of fluid to be delivered at the fluid outlet. Morever, a very exact adjusted setting of the temperature of the water delivered or output at the fluid outlet 5 is also possible. Therefore, the apparatus 1 according to the invention is especially suitable for tempering water in sanitary areas, lounge areas and/or on-board galleys in transportation vehicles of all kinds, particularly however in aircraft (see FIG. 2), without too strongly loading the electrical on-board power supply.

In a regeneration phase of the apparatus 1, especially during a low or weak load period of the electrical on-board power supply of a transportation vehicle, the hydrogen can again be directed from the first thermochemical reservoir 2 back into the second thermochemical reservoir 3. For this purpose, thermal energy must again be supplied to the first thermochemical reservoir 2 directly by means of the first reservoir tempering arrangement 15 and/or indirectly via the water through the first feed line tempering arrangement 20. The electrical energy necessary for this can be withdrawn, for example from the electrical on-board power supply of the pertinent transportation vehicle, during a low load phase. Through the return of the hydrogen to the second reservoir during a low load period of the electrical on-board power network of the transportation vehicle, simultaneously an evening-out or smoothing of the load curve arises as a side effect. Load peaks in the electrical on-board power supply, for example during the showering or during the meal preparation, are largely or substantially avoided. The entire electrical on-board power supply can therefore be dimensioned smaller, so that weight savings are possible, which are of important significance especially in aircraft.

If the hydrogen present in the system is nearly completely bound-up in the second thermochemical reservoir 3, the apparatus 1 again finds itself in the ready or standby phase, and the above described phases (ready or standby phase, use or utilization phase, and regeneration phase) can again be cycled through. In the ready phase, nearly the entire hydrogen present in the system is chemically bound-up in the form of a hydride of the second metal and/or of the second metal alloy 14. The thermal energy bound-up in the form of a metal hydride in the second thermochemical reservoir 3 can thus be stored over any desired or arbitrarily long time periods nearly without losses, and additionally be stored comfortably available upon demand.

During the transfer of the hydrogen from the first thermochemical reservoir 2 into the second thermochemical reservoir 3, heat must be removed from the second thermochemical reservoir 3 due to the hydrogen absorption, which heat can again be used for heating other thermal processes. Simultaneously, heat at a high temperature level must be supplied to the first thermochemical reservoir 2, in order to support or maintain the desorption of the hydrogen in this reservoir 2.

If necessary, fresh water can be supplied by means of the feed inlet 24 to the fluid reservoir 4, for example in order to compensate the water quantity withdrawn in the area of the fluid outlet 5 or other losses.

The use or inclusion of the fluid reservoir 4 is optional in the operation of the apparatus 1. However, an easier regulatability of the temperature of the water to be provided to the fluid outlet 5 arises through the use of the fluid reservoir 4, because temperature fluctuations in the area of the fluid outlet 5 or the fluid outlet regulating valve 30 can be more easily evened-out through the water quantity contained in the fluid reservoir 4.

Moreover, if necessary, hydrogen can be either supplied to or withdrawn from the apparatus 1 via a hydrogen line 41 connected to the hydrogen regulating valve 10. For example, the supply of hydrogen is necessary if leakage losses arise within the thermochemical reservoirs 2, 3. On the contrary it is also possible to withdraw hydrogen out of the apparatus 1, for example if hydrogen is released out of the apparatus 1 as a result of desorption out of the thermochemical reservoirs 2, 3. This released hydrogen can then, for example, be converted into electrical energy in a fuel cell 45, and this electrical energy can in turn be used for the operation of the reservoir tempering arrangements 15, 16 as well as the feed tempering arrangements 20, 22 or other electrically operated devices.

Also the pumps 35, 36 are purely optional. The circulation of the water within the apparatus can, for example, also take place through the thermosiphon principle solely due to gravity. Furthermore, the apparatus 1 is not limited to the tempering of water. Rather, any desired or arbitrary gaseous and/or liquid fluids, particularly however water, air, water steam or vapor, gaseous heating or cooling agents, heat transfer agents, and the like can be tempered.

The advantage of the apparatus 1 according to the invention relative to conventionally known embodiments is especially based in the nearly immediate or delay-free tempering of any desired or arbitrary fluid over wide temperature ranges, whereby simultaneously an evening-out or uniformalization of the load curve of the electrical on-board power supply is achieved and an excessive loading of the electrical on-board power supply is avoided.

Moreover the apparatus 1 for the tempering of fluids makes due or manages with a minimum of moving parts, so that the apparatus exhibits a high reliability or security against breakdown and low maintenance requirements.

In this application, the term "sorb" includes any one or more of "absorb", "adsorb" and "chemisorb". The term "sorption" includes any one or more of "absorption", "adsorption" and "chemisorption". The term "tempering" means heating and/or cooling, or adding and/or removing heat. The term "fluid" means a flowable medium that may be gaseous and/or liquid. The term "metal" includes any one or more of a metal alloy, a non-alloyed metal, a mixture or combination of non-alloyed metals and/or alloyed metals, and an elemental metal. The term "hydride-forming metal" refers to any metal capable of forming a hydride, or already having formed a hydride, i.e. a "hydride-forming metal" may include any one or more of the non-hydride state, the hydride state and intermediate states.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a transportation vehicle including a fluid supply system adapted to supply at least one of a gaseous fluid or a liquid fluid, wherein said fluid supply system includes a fluid outlet, a fluid inlet arrangement having at least one of a fluid inlet and a fluid reservoir, a fluid conduit system connecting said fluid inlet arrangement to said fluid outlet so as to provide said fluid from said fluid inlet arrangement to said fluid outlet, and a fluid tempering arrangement that is interposed in said fluid conduit system and adapted to at least one of heat or cool said fluid passing therethrough, an improvement wherein said fluid tempering arrangement comprises:

a first thermochemical reservoir that is adapted to store energy therein and that is arranged in heat exchange relation with said conduit system;

at least one valve that is at least one of interposed in said conduit system or connected to said first thermochemical reservoir; and a controller connected for control signal transmission to said at least one valve and adapted to variably control a transfer of heat between said fluid and said first thermochemical reservoir so as to adjustingly set a temperature of said fluid provided to said fluid outlet; and wherein said improvement further comprises a fuel cell connected via a hydrogen conduit to said first thermochemical reservoir.

2. In a transportation vehicle including a fluid supply system adapted to supply at least one of a gaseous fluid or a liquid fluid, wherein said fluid supply system includes a fluid outlet, a fluid inlet arrangement having at least one of a fluid inlet and a fluid reservoir, a fluid conduit system connecting said fluid inlet arrangement to said fluid outlet so as to provide said fluid from said fluid inlet arrangement to said fluid outlet, and a fluid tempering arrangement that is interposed in said fluid conduit system and adapted to at least one of heat or cool said fluid passing therethrough, an improvement wherein said fluid tempering arrangement comprises:

a first thermochemical reservoir that is adapted to store energy therein and that is arranged in heat exchange relation with said conduit system;

a second thermochemical reservoir that is adapted to store energy therein and that is arranged in heat exchange relation with said conduit system;

at least one valve that is at least one of interposed in said conduit system, connected to said first thermochemical reservoir, or connected to said second thermochemical reservoir;

a controller connected for control signal transmission to said at least one valve and adapted to variably control a transfer of heat between said fluid and said first thermochemical reservoir and said second thermochemical reservoir so as to adjustingly set a temperature of said fluid provided to said fluid outlet; and a fluid regulating valve interposed in said fluid conduit system between said fluid inlet arrangement, said first thermochemical reservoir and said second thermochemical reservoir;

wherein said fluid conduit system includes a first feed line connecting said fluid regulating valve to said first thermochemical reservoir and a second feed line connecting said fluid regulating valve to said second thermochemical reservoir and said fluid regulating valve selectively connects said fluid inlet arrangement to at least one of said first thermochemical reservoir via said first feed line or said second thermochemical reservoir via said second feed line; and wherein said fluid tempering arrangement further comprises an active first feed line tempering device interposed in or arranged in heat exchange relation with said first feed line and an active second feed line tempering device interposed in or arranged in heat exchange relation with said second feed line, and said controller is connected to said feed line tempering devices so as to control said feed line tempering devices.

3. The improvement in the transportation vehicle according to claim 2, wherein said transportation vehicle further includes an electrical power supply system, and said fluid tempering arrangement further comprises an electrical element, which is at least one of a heating element or a cooling element that is connected to said electrical power supply system and that is arranged in heat exchange relation with at least one of said fluid, said conduit system, said first thermochemical reservoir, or said second thermochemical reservoir.

4. The improvement in the transportation vehicle according to claim 2, wherein said transportation vehicle is an aircraft, and said fluid outlet is arranged in a galley, a restroom, a sanitary facility or a lounge area of said aircraft.

5. The improvement in the transportation vehicle according to claim 2, wherein said first thermochemical reservoir comprises a first container, a first hydride-forming metal disposed in said first container, and a first heat exchanger that is connected to or incorporated in said fluid conduit system and that is arranged in heat exchange relation with said first hydride-forming metal.

6. The improvement in the transportation vehicle according to claim 2, wherein said first thermochemical reservoir comprises a first hydride-forming metal that exhibits a first reaction temperature for absorption of hydrogen, said second thermochemical reservoir comprises a second hydride-forming metal that is different from said first hydride-forming metal and that exhibits a second reaction temperature for absorption of hydrogen, and said second reaction temperature is different from said first reaction temperature.

7. The improvement in the transportation vehicle according to claim 6, wherein said first thermochemical reservoir further comprises a first container that contains said first hydride-forming metal, said second thermochemical reservoir further comprises a second container that contains said second hydride-forming metal, said first hydride-forming metal exhibits a first hydrogen desorption temperature at a pressure of 1 bar, said second hydride-forming metal exhibits a second hydrogen desorption temperature at a pressure of 1 bar, and said second hydrogen desorption temperature is different from said first hydrogen desorption temperature.

8. The improvement in the transportation vehicle according to claim 7, wherein said first thermochemical reservoir further comprises a first hydrogen distributor arranged in said first container, said second thermochemical reservoir further comprises a second hydrogen distributor arranged in said second container, said fluid tempering arrangement further comprises a hydrogen transfer conduit connected to said first and second hydrogen distributors and a hydrogen regulating valve interposed in said hydrogen transfer conduit, and said controller is connected for control signal transmission to said hydrogen regulating valve so as to control said hydrogen regulating valve.

9. The improvement in the transportation vehicle according to claim 8, wherein said hydrogen regulating valve further has at least one of a hydrogen intake port or a hydrogen discharge port that can be selectively connected to at least one of a hydrogen source or a hydrogen sink.

10. The improvement in the transportation vehicle according to claim 2, wherein said fluid tempering arrangement further comprises an outlet regulating valve connected to said fluid outlet, said fluid conduit system further comprises a first return line connecting said first thermochemical reservoir to said outlet regulating valve and a second return line connecting said second thermochemical reservoir to said outlet regulating valve, and said outlet regulating valve is adapted to selectively communicate at least one of said first return line or said second return line to said fluid outlet.

11. The improvement in the transportation vehicle according to claim 10, wherein said fluid inlet arrangement includes said fluid reservoir, and said outlet regulating valve is further connected to said fluid reservoir and adapted to selectively communicate at least one of said first return line or said second return line to said fluid reservoir.

12. The improvement in the transportation vehicle according to claim 10, wherein said fluid tempering arrangement further comprises at least one pump interposed in at least one of said first return line or said second return line.

13. The improvement in the transportation vehicle according to claim 2, wherein said fluid tempering arrangement further comprises a temperature selection input device that is connected to said controller and that enables a user to input a selected temperature of said fluid to be provided via said fluid outlet, and said controller is adapted to control said fluid tempering arrangement so as to achieve at least one of a transfer of heat to said fluid from said first thermochemical reservoir or a transfer of heat from said fluid to, said second thermochemical reservoir, in response to and dependent on said selected temperature input via said temperature selection input device.

14. The improvement in the transportation vehicle according to claim 2, wherein said first thermochemical reservoir comprises a first hydride-forming metal and a first active reservoir tempering device arranged in heat exchange relation with said first hydride-forming metal, and said second thermochemical reservoir comprises a second hydride-forming metal and a second active reservoir tempering device arranged in heat exchange relation with said second hydride-forming metal, and wherein said controller is connected to said reservoir tempering devices so as to control said reservoir tempering devices.

15. The improvement in the transportation vehicle according to claim 2, expressly including said fluid in said fluid supply system including said fluid tempering arrangement, wherein said fluid is water.

16. The improvement in the transportation vehicle according to claim 2, further comprising a fuel cell connected via a hydrogen conduit to at least one of said thermochemical reservoirs.

17. In a transportation vehicle including a tap water supply system adapted to supply at least one of gaseous water or liquid water, wherein said tap water supply system includes a tap water outlet, a water inlet arrangement including a tap water inlet and a tap water storage tank connected thereto, a water conduit system connecting said water inlet arrangement to said water outlet so as to provide said water from said water inlet arrangement to said water outlet, and a water tempering arrangement that is interposed in said water conduit system and adapted to at least one of heat or cool said water passing therethrough, an improvement wherein said water tempering arrangement comprises:

a first thermochemical reservoir that is adapted to store energy therein and that includes a first heat exchanger arranged in heat exchange relation with said conduit system;

a second thermochemical reservoir that is adapted to store energy therein and that includes a second heat exchanger arranged in heat exchange relation with said conduit system;

a hydrogen transfer conduit connected between said first and second thermochemical reservoirs;

a hydrogen regulating valve interposed in said hydrogen transfer conduit, wherein said hydrogen regulating valve further has at least one of a hydrogen intake port or a hydrogen discharge port that can be selectively connected to at least one of a hydrogen source or a hydrogen sink; and a controller that is connected for control signal transmission to said hydrogen regulating valve, and that is adapted to variably control a transfer of heat between said water and said thermochemical reservoirs so as to adjustingly set a temperature of said water provided to said water outlet;

wherein:

said tap water supply system further includes a water outlet regulating valve having an outlet port connected to said tap water outlet and having first and second inlet ports and having a fourth port, and a water feed regulating valve having an inlet Port connected to said water inlet arrangement and having first and second outlet ports; and said conduit system comprises a first feed line connecting said first outlet port of said water feed regulating valve to a water inlet of said first heat exchanger, a first delivery line connecting an outlet of said first heat exchanger to said first inlet port of said water outlet regulating valve, a second feed line connecting said second outlet port of said water feed regulating valve to a water inlet of said second heat exchanger, a second delivery line connecting an outlet of said second heat exchanger to said second inlet port of said water outlet regulating valve, and a recirculation line connecting said fourth port of said water outlet regulating valve to said water storage tank.

18. In a transportation vehicle including a tap water supply system adapted to supply tap water to a tap water outlet in a galley, a restroom, a sanitary facility or a lounge area of said transportation vehicle, wherein said tap water supply system includes said tap water, said tap water outlet, a tap water inlet arrangement including a tap water inlet feeding into a tap water storage tank, a water conduit system connecting said water inlet arrangement to said water outlet so as to provide said water from said water inlet arrangement to said water outlet, and a water tempering arrangement that is interposed in said water conduit system and adapted to at least one of heat or cool said water passing therethrough, an improvement wherein said water tempering arrangement comprises:

a first thermochemical reservoir that is adapted to store energy therein and that comprises a first hydride-forming metal and a first heat exchanger which is connected to or incorporated in said conduit system and is arranged in heat exchange relation with said first hydride-forming metal, wherein said first hydride-forming metal exhibits a first reaction temperature for absorption of hydrogen;

a second thermochemical reservoir that is adapted to store energy therein and that comprises a second hydride-forming metal different from said first hydride-forming metal, and a second heat exchanger which is connected to or incorporated in said conduit system and is arranged in heat exchange relation with said second hydride-forming metal, wherein said second hydride-forming metal exhibits a second reaction temperature for absorption of hydrogen which is different from said first reaction temperature;

at least one valve interposed in said conduit system or connected to at least one of said thermochemical reservoirs; and a controller connected for control signal transmission to said at least one valve and adapted to variably control a transfer of heat between said water and said thermochemical reservoirs so as to adjustingly set a temperature of said water provided to said water outlet;

wherein:

said at least one valve includes a water outlet regulating valve having an outlet port connected to said tap water outlet and having first and second inlet ports and having a fourth port, and a water feed regulating valve having an inlet port connected to said water inlet arrangement and having first and second outlet ports; and said conduit system comprises a first feed line connecting said first outlet port of said water feed regulating valve to an inlet of said first heat exchanger, a first delivery line connecting an outlet of said first heat exchanger to said first inlet port of said water outlet regulating valve, a second feed line connecting said second outlet port of said water feed regulating valve to an inlet of said second heat exchanger, a second delivery line connecting an outlet of said second heat exchanger to said second inlet port of said water outlet regulating valve, and a recirculation line connecting said fourth port of said water outlet regulating valve to said water storage tank.

19. The improvement in the transportation vehicle according to claim 18, wherein:

said conduit system further comprises a first bypass line connected between said first feed line and said first delivery line, and a second bypass line connected between said second feed line and said second delivery lines; and said at least one valve further comprises a first bypass valve interposed in said first bypass line, and a second bypass valve interposed in said second bypass line.

20. The improvement in the transportation vehicle according to claim 18, wherein said tempering arrangement further comprises a first electric heating element interposed in said first feed line, and a second electric heating element interposed in said second feed line.

21. The improvement in the transportation vehicle according to claim 18, wherein said water tempering arrangement further comprises a hydrogen transfer conduit connected between said first and second thermochemical reservoirs, and a hydrogen regulating valve interposed in said hydrogen transfer conduit, wherein said hydrogen regulating valve has a hydrogen intake or discharge port that can be selectively connected to a hydrogen source or a hydrogen sink.

22. The improvement in the transportation vehicle according to claim 21, further comprising a fuel cell as said hydrogen sink connected to said hydrogen discharge port of said hydrogen regulating valve.

23. The improvement in the transportation vehicle according to claim 18, wherein said transportation vehicle is a transport aircraft having at least said galley and said restroom therein.

24. In a transportation vehicle including a tap water supply system adapted to supply tap water to a tap water outlet in a galley, a restroom, a sanitary facility or a lounge area of said transportation vehicle, wherein said tap water supply system includes said tap water, said tap water outlet, a tap water inlet arrangement having at least one of a tap water inlet and a tap water reservoir, a water conduit system connecting said water inlet arrangement to said water outlet so as to provide said water from said water inlet arrangement to said water outlet, and a water tempering arrangement that is interposed in said water conduit system and adapted to at least one of heat or cool said water passing therethrough, an improvement wherein said water tempering arrangement comprises:

a first thermochemical reservoir that is adapted to store energy therein and that comprises a first hydride-forming metal and a first heat exchanger which is connected to or incorporated in said conduit system and is arranged in heat exchange relation with said first hydride-forming metal, wherein said first hydride-forming metal exhibits a first reaction temperature for absorption of hydrogen;

a second thermochemical reservoir that is adapted to store energy therein and that comprises a second hydride-forming metal different from said first hydride-forming metal, and a second heat exchanger which is connected to or incorporated in said conduit system and is arranged in heat exchange relation with said second hydride-forming metal, wherein said second hydride-forming metal exhibits a second reaction temperature for absorption of hydrogen which is different from said first reaction temperature;

at least one valve interposed in said conduit system or connected to at least one of said thermochemical reservoirs;

a controller connected for control signal transmission to said at least one valve and adapted to variably control a transfer of heat between said water and said thermochemical reservoirs so as to adjustingly set a temperature of said water provided to said water outlet; and a hydrogen transfer conduit connected between said first and second thermochemical reservoirs; and wherein said at least one valve comprises a hydrogen regulating valve interposed in said hydrogen transfer conduit, wherein said hydrogen regulating valve has a hydrogen intake or discharge port that can be selectively connected to a hydrogen source or a hydrogen sink; and further comprising a fuel cell as said hydrogen sink connected to said hydrogen discharge port of said hydrogen regulating valve.

25. The improvement in the transportation vehicle according to claim 24, wherein:

said at least one valve includes a water outlet regulating valve having an outlet port connected to said tap water outlet and having first and second inlet ports, and a water feed regulating valve having an inlet port connected to said water inlet arrangement and having first and second outlet ports; and said conduit system comprises a first feed line connecting said first outlet port of said water feed regulating valve to an inlet of said first heat exchanger, a first delivery line connecting an outlet of said first heat exchanger to said first inlet port of said water outlet regulating valve, a second feed line connecting said second outlet port of said water feed regulating valve to an inlet of said second heat exchanger, and a second delivery line connecting an outlet of said second heat exchanger to said second inlet port of said water outlet regulating valve.

26. The improvement in the transportation vehicle according to claim 25, wherein:

said conduit system further comprises a first bypass line connected between said first feed line and said first delivery line, and a second bypass line connected between said second feed line and said second delivery line; and said at least one valve further comprises a first bypass valve interposed in said first bypass line, and a second bypass valve interposed in said second bypass line.

27. The improvement in the transportation vehicle according to claim 25, wherein said tempering arrangement further comprises a first electric heating element interposed in said first feed line, and a second electric heating element interposed in said second feed line.

28. The improvement in the transportation vehicle according to claim 25, wherein said water inlet arrangement comprises a tap water storage tank as said tap water reservoir, and said water inlet feeding into said tap water storage tank.

29. The improvement in the transportation vehicle according to claim 28, wherein said water outlet regulating valve further has a fourth port, and said conduit system further comprises a recirculation line connecting said fourth port of said water outlet regulating valve to said water storage tank.

30. The improvement in the transportation vehicle according to claim 24, wherein said transportation vehicle is a transport aircraft having at least said galley and said restroom therein.

* * * * *

UNITED STATES PATENT AND TRADEMARK OFFICE
CERTIFICATE OF CORRECTION

PATENT NO. : 7,581,698 B2  Page 1 of 1
APPLICATION NO. : 11/115074
DATED : September 1, 2009
INVENTOR(S) : Hoehne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,581,698 B2 | |
| APPLICATION NO. | : 11/115074 | |
| DATED | : September 1, 2009 | |
| INVENTOR(S) | : Hoehne et al. | |

It is certified that error appears in the above-identified patent and that said Letters Patent is hereby corrected as shown below:

Column 4,
Line 41, after "which", delete "the";
Line 48, after "AND OF THE", delete the empty line;

Column 6,
After Line 46, insert the following paragraph:

--The fluid reservoir 4 for storing the water is provided with an
external supply or feed inlet 24 in order to be able to refill, if
necessary, possible water losses or water removed at the fluid outlet
5. Beginning from the fluid reservoir 4, the water first comes via the
line 25 to the regulating valve 26. The regulating valve 26 is again
preferably electrically operable by means of the control and regulating
arrangement 12. The regulating valve 26 is connected via a line 27
with the first feed line 19 to the first heat exchanger 17. From the
first heat exchanger 17, the water proceeds via a first return line 28
as well as a further line 29 back to a fluid outlet regulating valve
30. From the fluid outlet regulating valve 30, the water is directed
either to the fluid outlet 5 that is not shown in further detail in the
drawing, or via a further line 31 again back into the fluid reservoir
4. The return or feedback of the water into the fluid reservoir 4 can,
for example, be used to reduce or to even-out or uniformalize the
temperature of the water through mixing within the fluid reservoir 4.--

Lines 56-62, delete the paragraph and replace with

The fluid outlet 5 may involve any desired or arbitrary
water withdrawing location, fixture or device, for example
a water tap or faucet <u>in a lounge area, a galley, or a</u>

Signed and Sealed this
Fifth Day of April, 2011

David J. Kappos
*Director of the United States Patent and Trademark Office* restroom or sanitary facility, a water mixing battery, a shower, a bathtub inlet or fill tap, or the like, in a transportation vehicle such as an aircraft schematically shown in Fig. 2. Furthermore, the fluid outlet 5 can also be any desired or arbitrary kitchen appliance, for example a coffee or espresso machine, as well as a water bath for meal or food heating, or the like.

Column 13,
Line 9, after "fluid to", delete ",";

Column 14,
Line 6, after "inlet", replace "Port" by --port--;

Column 15,
Line 22, replace "lines" by --line--;

Column 16,
Line 54, after "between"; delete the paragraph break;
Line 55, after "line; and" insert a paragraph break.

UNITED STATES PATENT AND TRADEMARK OFFICE
CERTIFICATE OF CORRECTION

PATENT NO. : 7,581,698 B2
APPLICATION NO. : 11/115074
DATED : September 1, 2009
INVENTOR(S) : Hoehne et al.

It is certified that error appears in the above-identified patent and that said Letters Patent is hereby corrected as shown below:

Column 4,
Line 41, after "which", delete "the";
Line 48, after "AND OF THE", delete the empty line;

Column 6,
After Line 46, insert the following paragraph:

--The fluid reservoir 4 for storing the water is provided with an external supply or feed inlet 24 in order to be able to refill, if necessary, possible water losses or water removed at the fluid outlet 5. Beginning from the fluid reservoir 4, the water first comes via the line 25 to the regulating valve 26. The regulating valve 26 is again preferably electrically operable by means of the control and regulating arrangement 12. The regulating valve 26 is connected via a line 27 with the first feed line 19 to the first heat exchanger 17. From the first heat exchanger 17, the water proceeds via a first return line 28 as well as a further line 29 back to a fluid outlet regulating valve 30. From the fluid outlet regulating valve 30, the water is directed either to the fluid outlet 5 that is not shown in further detail in the drawing, or via a further line 31 again back into the fluid reservoir 4. The return or feedback of the water into the fluid reservoir 4 can, for example, be used to reduce or to even-out or uniformalize the temperature of the water through mixing within the fluid reservoir 4.--

Lines 56-62, delete the paragraph.

This certificate supersedes the Certificate of Correction issued April 5, 2011.

Signed and Sealed this
Fourth Day of September, 2012

David J. Kappos
*Director of the United States Patent and Trademark Office*

CERTIFICATE OF CORRECTION (continued)
U.S. Pat. No. 7,581,698 B2

Column 13,
Line 9, after "fluid to", delete ",";

Column 14,
Line 6, after "inlet", replace "Port" by --port--;

Column 15,
Line 22, replace "lines" by --line--;

Column 16,
Line 54, after "between", delete the paragraph break;
Line 55, after "line; and", insert a paragraph break.